(12) United States Patent
Dai et al.

(10) Patent No.: US 11,462,765 B2
(45) Date of Patent: Oct. 4, 2022

(54) MOF BASED COMPOSITE ELECTROLYTE FOR LITHIUM METAL BATTERIES

(71) Applicant: GM GLOBAL TECHNOLOGY OPERATIONS LLC, Detroit, MI (US)

(72) Inventors: Fang Dai, Troy, MI (US); Anne M. Dailly, West Bloomfield, MI (US); Mei Cai, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 298 days.

(21) Appl. No.: 16/742,399

(22) Filed: Jan. 14, 2020

(65) Prior Publication Data
US 2021/0218057 A1 Jul. 15, 2021

(51) Int. Cl.
| | | |
|---|---|---|
| *H01M 10/056* | (2010.01) | |
| *H01M 4/505* | (2010.01) | |
| *H01M 4/525* | (2010.01) | |
| *H01M 4/38* | (2006.01) | |
| *H01M 4/136* | (2010.01) | |
| *H01M 4/134* | (2010.01) | |
| *H01M 4/58* | (2010.01) | |
| *H01M 10/0569* | (2010.01) | |
| *H01M 4/131* | (2010.01) | |
| *H01M 50/446* | (2021.01) | |
| *H01M 50/426* | (2021.01) | |
| *H01M 50/411* | (2021.01) | |
| *H01M 50/42* | (2021.01) | |
| *H01M 50/417* | (2021.01) | |

(Continued)

(52) U.S. Cl.
CPC ......... *H01M 10/056* (2013.01); *H01M 4/131* (2013.01); *H01M 4/134* (2013.01); *H01M 4/136* (2013.01); *H01M 4/382* (2013.01); *H01M 4/505* (2013.01); *H01M 4/525* (2013.01); *H01M 4/5825* (2013.01); *H01M 10/052* (2013.01); *H01M 10/0569* (2013.01); *H01M 50/411* (2021.01); *H01M 50/417* (2021.01); *H01M 50/42* (2021.01); *H01M 50/426* (2021.01); *H01M 50/446* (2021.01); *H01M 2004/027* (2013.01); *H01M 2004/028* (2013.01); *H01M 2300/0028* (2013.01); *H01M 2300/0085* (2013.01)

(58) Field of Classification Search
None
See application file for complete search history.

(56) References Cited

U.S. PATENT DOCUMENTS

2016/0254567 A1* 9/2016 Cai ............ H01M 10/052
 429/306
2018/0226682 A1* 8/2018 Lu ............. H01M 10/056

OTHER PUBLICATIONS

Zhang et al., "Synthesis of poly(ethylene-oxide)/nanoclay solid polymer electrolyte for all solid-state lithium/sulfur battery" (2015), Ionics, 21: 381.

* cited by examiner

*Primary Examiner* — Laura Weiner
(74) *Attorney, Agent, or Firm* — Cantor Colburn LLP

(57) ABSTRACT

In an embodiment, a metal-organic framework electrolyte layer, can comprise a plurality of metal-organic frameworks having a porous structure and comprising a solvated salt absorbed in the porous structure; and a polymer. The MOF electrolyte layer can have at least one of a density of less than or equal to 0.3 g/cm$^3$ or a Brunauer-Emmett-Teller surface area of 500 to 4,000 m$^2$/g. A lithium metal battery can comprise the metal-organic framework electrolyte layer.

12 Claims, 3 Drawing Sheets

(51) Int. Cl.
*H01M 10/052* (2010.01)
*H01M 4/02* (2006.01)

MOF BASED COMPOSITE ELECTROLYTE FOR LITHIUM METAL BATTERIES

INTRODUCTION

As a result of an increased energy demand, energy storage is a growing global concern. Electrochemical energy storage technologies are continually being developed to meet this ever growing demand. Among the many options being developed are secondary, or rechargeable, lithium-based batteries as they are high-performance batteries known to have one of the highest energy densities as compared with other commercially available secondary batteries. In addition to the high energy density of lithium batteries, they can also exhibit a high power capability, a general non-appearance of a memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source. For example, lithium-based batteries are often used in stationary and portable devices, such as those encountered in the consumer electronics, automobile/automotive, medical equipment, machinery, robotics, and aerospace industries. In the automotive industry, lithium-based batteries can be used in electric-based vehicles, such as hybrid electric vehicles (HEV), battery electric vehicles (BEV), plug-in HEVs, and extended-range electric vehicles (EREV).

Continued improvements in lithium battery materials are desired, for example, to increase battery capacity with cycling.

SUMMARY

In one exemplary embodiment, a metal-organic framework (MOF) electrolyte layer, can comprise a plurality of metal-organic frameworks having a porous structure and comprising a solvated salt absorbed in the porous structure and a polymer. The MOF electrolyte layer can have at least one of a density of less than or equal to 0.3 grams per centimeter cubed ($g/cm^3$) or a Brunauer-Emmett-Teller (BET) surface area of 500 to 4,000 meters squared per gram ($m^2/g$).

In addition to one or more of the features described herein, the plurality of metal-organic frameworks can have at least one of an average pore size of the MOFs can be 1 to 5 nanometers, a pore volume of greater than 0 to 6 centimeters cubed per gram ($cm^3/g$), or a BET surface area of 2,000 to 4,000 $m^2/g$.

In addition to one or more of the features described herein, the plurality of metal-organic frameworks can comprise at least one of an aluminum based MOF, a copper based MOF, an indium based MOF, an iron based MOF, a manganese based MOF, a zirconium based MOF, or a zinc based MOF.

In addition to one or more of the features described herein, the solvated salt can comprise a lithium salt of at least one of $ClO_4^-$, $BF_4^-$, $PF_6^-$, $TFSI^-$, or $FSI^-$.

In addition to one or more of the features described herein, the polymer can comprise at least one of a fluoropolymer, a polyolefin, an acrylate, or polyacrylonitrile.

In addition to one or more of the features described herein, the MOF electrolyte layer can comprise 50 to 75 weight percent (wt %) based of the metal-organic framework based on the total weight of the MOF electrolyte layer.

In addition to one or more of the features described herein, the MOF electrolyte layer can comprise 25 to 50 weight percent based of the polymer based on the total weight of the MOF electrolyte layer.

In addition to one or more of the features described herein, the MOF electrolyte layer can have a thickness of 5 to 50 micrometers.

In yet another exemplary embodiment, a lithium metal battery can comprise the MOF electrolyte layer comprising a polymer and a plurality of metal-organic frameworks having a porous structure and comprising a solvated salt absorbed in the porous structure. The MOF electrolyte layer can have at least one of a density of less than or equal to 0.3 $g/cm^3$ or a Brunauer-Emmett-Teller (BET) surface area of 500 to 4,000 $m^2/g$. A negative electrode can be located on a first side of the MOF electrolyte layer. A positive electrode can be located on a second side of the MOF electrolyte layer opposite the negative electrode. The positive electrode and the negative electrode can be connected via a closed external circuit. A separator layer can be located in between the positive electrode and the MOF electrolyte layer. An outer encapsulation layer can form an enclosure around the negative electrode, the MOF electrolyte layer, the separator layer, and the positive electrode.

In addition to one or more of the features described herein, the negative electrode can comprise a lithium metal and the positive electrode can comprise at least one of $LiCoO_2$, $LiNiMnCoO_2$, lithium iron phosphate, lithium iron fluorophosphate, an over-lithiated layer by layer electrode, spinel lithium manganese oxide, lithium cobalt oxide, $LiNi_{0.5}Mn_{1.5}O_4$, lithium nickel cobalt aluminum oxide, lithium vanadium oxide, or $Li_2MSiO_4$, where M is at least one of Co, Fe, or Mn.

In yet another exemplary embodiment, a method of making a MOF electrolyte layer can comprise forming a mixture comprising a plurality of metal-organic frameworks comprising an absorbed solvated salt and a polymer; and forming the MOF electrolyte layer from the mixture. The MOF electrolyte layer can comprise a polymer and a plurality of metal-organic frameworks having a porous structure and a solvated salt absorbed in the porous structure. The MOF electrolyte layer can have at least one of a density of less than or equal to 0.3 $g/cm^3$ or a BET surface area of 500 to 4,000 $m^2/g$.

In addition to one or more of the features described herein, the mixture can further comprise a slurry solvent and the forming the MOF electrolyte layer can comprise solution casting and drying.

In addition to one or more of the features described herein, the mixing can comprise mixing at a temperature greater than the glass transition temperature of the polymer and the forming the MOF electrolyte layer can comprise molding.

In addition to one or more of the features described herein, the forming the plurality of metal-organic frameworks can comprise soaking the plurality of metal-organic frameworks in a non-aqueous solvent and a liquid electrolyte comprising the solvated salt for an amount of time sufficient to absorb the solvated salt into the porous structure of the metal-organic frameworks.

The above features and advantages, and other features and advantages of the disclosure are readily apparent from the following detailed description when taken in connection with the accompanying drawings and claims.

BRIEF DESCRIPTION OF THE DRAWINGS

Other features, advantages, and details appear, by way of example only, in the following detailed description, the detailed description referring to the drawings, in which.

DETAILED DESCRIPTION

The following description is merely exemplary in nature and is not intended to limit the present disclosure, its application, or uses.

Lithium batteries include an electrolyte layer to facilitate ion transfer from one electrode to the other. This layer generally determines the current (power) density, the time stability, and the overall safety of the battery. Polymer electrolyte layers generally fall into one of three categories including a solid polymer electrolyte layer, a polymer gel electrolyte, or a composite electrolyte that comprises a conductive solid. Each of these electrolyte layers though has its own drawbacks. For example, solid polymer electrolyte layers and composite electrolytes often suffer from ionic conductivity limits and polymer gel electrolytes generally have poor mechanical properties.

A new polymer-based electrolyte layer offers one or more improvements over the typical polymer-based electrolyte layers. Specifically, the polymer-based electrolyte layer comprises a metal-organic framework (MOF) having a porous structure with a solvated salt absorbed in the porous structure; and a polymer. This layer is referred to herein as a MOF electrolyte layer. Anions of the solvated salt interact with respective metal atoms of the MOF framework. For example, the anions can interact electrostatically or can form ionic bonds with metal atoms of the MOF framework. The bound anions can transform the pores of the MOFs to ionic channels, thereby forming an electrolyte structure that can facilitate the transfer of solvated cations through the pores of the MOF. The open pore structure of the MOFs can result in an improved transport of ions through the MOF electrolyte layer as compared to electrolyte layers comprising crushed or degraded MOFs.

Figure 1:
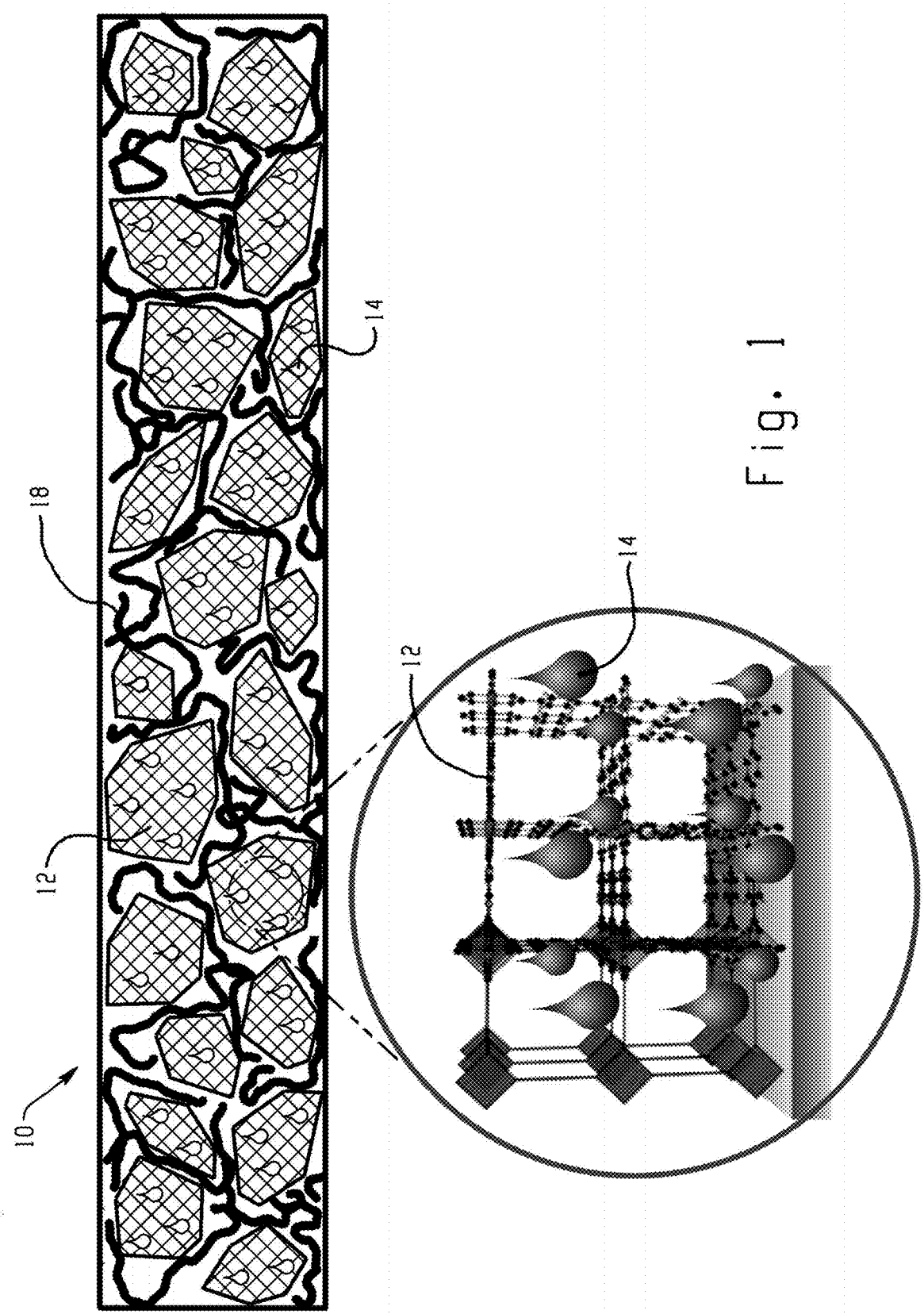
FIG. 1 is an illustration of a MOF electrolyte layer.

FIG. 1 is an illustration of an aspect of the MOF electrolyte layer 10 having an enlarged image of a metal-organic framework 12. The MOF electrolyte layer 10 comprises a plurality of metal-organic frameworks 12 having an absorbed solvated salt 14 in the pore structure of the metal-organic frameworks 12. The metal-organic frameworks 12 are disposed in polymer 18.

The metal-organic frameworks 12 are not particularly limited and can be selected, based on having desired pore size, pore volume, metal center, and compatibility to the liquid electrolyte (also referred to herein as the solvated salt). In general, the MOFs are a class of crystalline materials constructed from metal centers and organic ligands, which have a porous structure that is capable of hosting guest species. The metal centers can comprise at least one of Al, In, Cu, Fe, or Mn. The ligand can comprise at least one of benzene-1,3,5-tricarboxylic acid (BTC), benzene-1,4-dicarboxylic acid (BDC), azobenzene-4,4'-dicarboxylic acid (ADC), or isonicotinic acid (IN). The MOFs can include at least one of an aluminum based MOF (for example, $Al_3O(OH)(BTC)_2$ (MIL-100-Al)), a copper based MOF (for example, $Cu_3(BTC)_2$ (HKUST-1)), an indium based MOF (for example, $(In_3O)(OH)(ADC)_2(In)_2)$ (In-MOF)), an iron based MOF (for example, $Fe_3O(OH)(BTC)_2$ (MIL-100-Fe)), a manganese based MOF (for example, $Mn_3(BD)_3$ (MOF-73)), a zirconium based MOF (for example, $Zr_6O_4(OH)_4(BDC)_{12}$) or a zinc based MOF (for example, $Zn_4O(BDC)_3$ (MOF-5; IRMOF-1)).

The pores of the MOF can be large enough to accommodate the absorption of anions of a salt into the pores of the MOF, as well as solvated cations such as lithium ions or sodium ions. The MOFs can be mesoporous, for example, having an average pore size of as much as 8 nanometers or the MOFs can be microporous, for example, having an average pore size of less than or equal to 2 nanometers. The MOFs can have an average pore size that can be less than or equal to 8 nanometers (nm), or less than or equal to 3 nanometers, or 0.5 to 2 nanometers. The MOFs can have a pore volume of greater than 0 to 6 $cm^3/g$, or 0.2 to 5 $cm^3/g$, or 0.2 to 2.5 $cm^3/g$. The MOF can have a Brunauer-Emmett-Teller surface area of 500 to 4,000 $m^2/g$, or 2,000 to 4,000 $m^2/g$. The pore size or the pore volume can be determined by measuring the full isotherm with argon adsorption and determining the highest relative pressure ($P/P_o$) (for example, when $P/P_o=0.995$) of the isotherm.

The MOFs can be synthesized in the presence of a solvent (for example, water) and the ligand, where the solvent and the ligand coordinate with the MOF's metal centers. Removal of the solvent molecules (for example, at an elevated temperature under vacuum) can break the solvent coordination from the MOFs, resulting in MOF scaffolds with unsaturated metal centers. The elevated temperature can be 80 to 220 degrees Celsius (° C.). The vacuum can be at a pressure of 25 to 35 millitorr (mTorr) or higher, for example, using at pressures high enough to allow for the formation of supercritical carbon dioxide when activation with supercritical carbon dioxide is used.

The solvated salt can be absorbed by the pores of the MOFs to form an electrolyte structure in the MOFs. The anions (for example, at least one of $ClO_4^-$, $BF_4^-$, $PF_6^-$, bis(trifluoromethane)sulfonimide ($TFSI^-$), or bis(fluorosulfonyl)imide ($FSI^-$)) of the solvated salt can interact with (for example, can bind to) the open-metal sites of the MOF scaffold. The absorption of the anions constructs negatively charged channels in the pores of the MOF scaffold that can enable fast conduction of solvated cations (for example, at least one of $Li^+$, $Na^+$, $Mg^{2+}$, or $Zn^{2+}$). Greater than or equal to 80 volume percent (vol %), or 80 to 99.9 volume percent, or 90 to 98 volume percent of the total volume of the pores can be filled with the absorbed solvate salt 14. The pores of the metal-organic framework 12 can be free of the polymer 14.

The solvated salt 14 can be absorbed into the pores of the metal-organic frameworks 12 by soaking the metal-organic frameworks 12 in a liquid electrolyte (also referred to herein as the solvated salt) and a non-aqueous solvent for an amount of time sufficient to allow the solvated salt 14 to absorb into the pores of the metal-organic frameworks 12. The metal-organic frameworks 12 are dried prior to the soaking in the liquid phase electrolyte.

The non-aqueous solvent can comprise at least one of butylene carbonate (BC), butylmethyl carbonate (BMC), γ-butyrolactone, cyclopentanone, diethyl carbonate (DEC), diethyl oxalate, dimethyl carbonate (DMC), dimethyl sulfoxide, 1,3-dioxolane, dipropyl carbonate (DPC), 1,2-diethoxymethane, 2-ethoxyethyl acetate, ethyl acetate, ethylene carbonate (EC), ethylmethyl carbonate (EMC), ethylpropyl carbonate (EPC), fluoroethylene carbonate (FEC), methyl acetate, 2-methoxyethyl acetate, methyl isobutyryl acetate, 3-methyl-1,3-oxazolidine-2-one, methylpropyl carbonate (MPC), 2-methyltetrahydrofuran, nitromethane, 1,3-propane sultone, propylene carbonate (PC), sulfolane, tetrahydrofuran, or γ-valerolactone. The polarity of the non-aqueous solvent can be selected to match the surface properties of the MOF material.

The metal salt of the solvated salt 14 that is dissolved in the non-aqueous solvent can comprise at least one of a lithium salt, a magnesium salt, a sodium salt, or a zinc salt. The lithium salt can comprise at least one of lithium bis (oxalate borate), lithium bis(trifluoromethlysulfonylimide) (LiTFSI), lithium bis(trifluorosulfonylimide), lithium chloride, lithium hexafluoroarsenate, lithium hexafluorophosphate (LiPF$_6$), lithium perchlorate, lithium fluoroalkylsufonimides, lithium fluoroarylsufonimides, lithium tetrachloroaluminate, lithium tetrafluoroborate, lithium trifluoromethanesulfonate, or lithium tris(trifluoromethylsulfonylimide)methide.

The sodium salt can comprise at least one of NaBF$_4$, sodium(I) bis(trifluoromethanesulfonyl)imide (NaTFSI), sodium(I) bis(fluorosulfonyl)imide (NaFSI), NaClO$_4$, sodium trifluoromethanesulfonate, or NaPF$_6$. The magnesium salt can comprise at least one of magnesium trifluoromethanesulfonate, Mg(ClO$_4$)$_2$, Mg(PF$_6$)$_2$, Mg(BF$_4$)$_2$, magnesium(II) bis(trifluoromethanesulfonyl)imide (Mg(TFSI)$_2$), or magnesium(II) bis(fluorosulfonyl)imide (Mg(FSI)$_2$). The zinc salt can comprise at least one of zinc trifluoromethanesulfonate, Zn(ClO$_4$)$_2$, Zn(PF$_6$)$_2$, Zn(BF$_4$)$_2$, zinc(II) bis(trifluoromethanesulfonyl)imide (Zn(TFSI)$_2$), or zinc(II) bis(fluorosulfonyl)imide (Zn(FSI)$_2$). The metal salt can be selected to have a suitably sized anion to ensure that the anion can infiltrate into at least some of the MOF pores.

The MOF electrolyte layer 10 can be formed by mixing the metal-organic frameworks 12 including the absorbed solvated salt 14 with a dissolved or a molten polymer. The polymer can comprise at least one of a fluoropolymer (for example, at least one of poly(vinylidene fluoride) or polytetrafluoroethylene), a polyolefin (for example, at least one of polyethylene or polypropylene), an acrylate (for example, poly(methyl (meth)acrylate) or poly(meth)acrylate), or polyacrylonitrile.

The mixing with the polymer can comprise mixing the metal-organic frameworks 12 with a polymer dissolved in a slurry solvent to form a slurry. The slurry can be solution cast and dried to remove the slurry solvent and form the MOF electrolyte layer 10. Conversely, the MOF electrolyte layer 10 can be formed by forming a slurry comprising the metal-organic frameworks 12, the liquid phase electrolyte, the slurry solvent and/or the non-aqueous solvent, and the polymer 18; casting the slurry; and drying to form the MOF electrolyte layer 10. The slurry solvent can have a lower evaporation temperature than the electrolyte. The slurry solvent can comprise at least one of acetone, 2-butanone, cyclohexanone, dimethylacetamide (DMA), N,N-dimethylformamide (DMF), dimethyl sulfoxide (DMSO), N-methyl-2-pyrrolidone (NMP), or tetrahydrofuran (THF).

The MOF electrolyte layer 10 can be formed by mixing the metal-organic frameworks 12 with a molten polymer, for example, at a temperature greater than or equal to the glass transition temperature of the polymer to form a molten mixture. The molten mixture can then be molded to form the MOF electrolyte layer 10. The mixing of the molten polymer can be at a temperature of greater than or equal to the glass transition temperature of the polymer, or 10 to 50 degrees more than the glass transition temperature of the polymer.

After forming the MOF electrolyte layer 10, the MOF electrolyte layer 10 can be washed prior to being incorporated into a battery.

The MOF layer 10 can comprise 50 to 75 wt %, or 60 to 70 wt % of the metal-organic frameworks 12 based on the total weight of the MOF layer 10. The MOF layer 10 can comprise 25 to 50 wt %, or 30 to 40 wt % of the polymer 18 based on the total weight of the MOF layer 10. The MOF electrolyte layer 10 can have a thickness of 5 to 50 micrometers, or 10 to 30 micrometers.

The MOF electrolyte layer 10 can provide many advantages over traditional electrolyte layers, such as increased ionic conductivity, Coulombic efficiency, electrochemical stability, or mechanical robustness. Regarding the high ionic conductivity, Coulombic efficiency, and electrochemical stability, the ionic channels of the MOF electrolyte layer 10 can utilize immobilized anions to facilitate the transport of cations through the MOF electrolyte layer 10 with a low activation energy.

Regarding the mechanical robustness, the MOF electrolyte layer 10 can be a free-standing layer, for example, that can hold its shape with picked up without a supporting layer. The MOF electrolyte layer 10 can have a density of 0.3 g/cm$^3$, or 0.035 to 0.3 g/cm$^3$, or 0.03 to 0.2 g/cm$^3$.

Still further, the MOF electrolyte layer can reduce the occurrence of Li-dendrite growth and can result in an improvement in flammability ratings.

Figure 2:
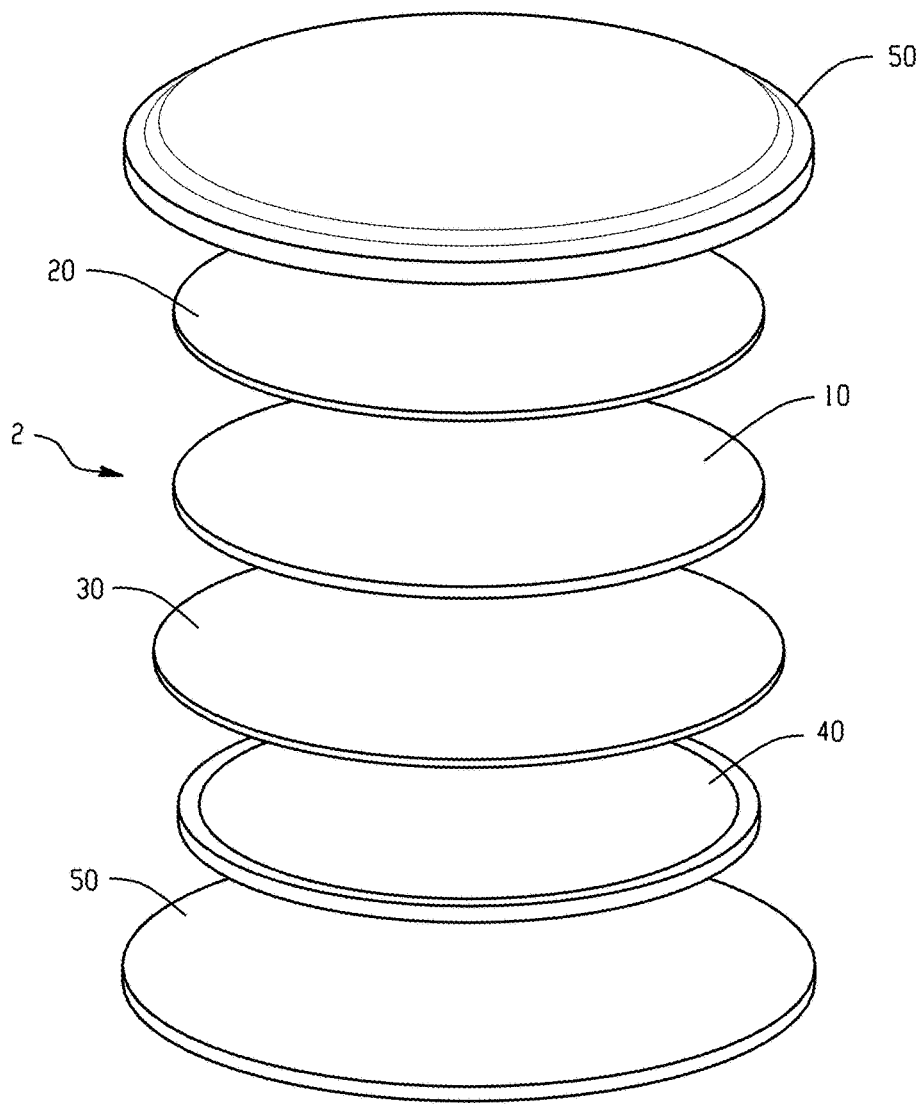
FIG. 2 is an illustration of a lithium metal battery comprising the MOF electrolyte layer.

A battery (for example, a lithium metal battery) can comprise the MOF electrolyte layer 10. FIG. 2 is an illustration of a battery 2 comprising the MOF electrolyte layer 10. A negative electrode 20 can be located on one side of the MOF electrolyte layer 10. The negative electrode 20 can be in direct physical contact with the MOF electrolyte layer 10. A positive electrode 40 can be located on a side of the MOF electrolyte layer 10 opposite the negative electrode 20. A separator layer 30 can be located between the positive electrode 40 and the MOF electrolyte layer 10. The respective layers can be wound together or stacked. Outer encapsulation layers 50 can enclose the negative electrode 20, the MOF electrolyte layer 10, the separator layer 30, and the positive electrode 30. The negative electrode 20 and the positive electrode 40 can be connected via a closed circuit external to the encapsulation layers 50.

The battery 2 can generate a useful electric current during discharge by way of reversible electrochemical reactions that occur when the negative electrode 20 is connected to the positive electrode 40 via a closed external circuit. In a lithium metal battery, an average chemical potential difference between the positive electrode 40 and the negative electrode 20 can drive electrons produced by the oxidation of lithium at the negative electrode 20 through the external circuit towards the positive electrode 40. Likewise, lithium ions produced at the negative electrode 20 can be carried through the ionic channels of the MOF electrolyte layer 10 towards the positive electrode 40. Lithium ions entering the channels of the MOF electrolyte layer 10 at the negative electrode 20 can recombine with electrons at an interface between the MOF electrolyte layer 10 and the positive electrode 40. The electrons flowing through the external circuit can reduce lithium ions migrating across the MOF electrolyte layer 10 to form inserted lithium at the positive electrode 40. The electric current passing through the external circuit can thereby be harnessed until the inserted lithium in the negative electrode 20 is depleted, the capacity of the lithium metal battery is diminished below a useful level for a particular application, or until the need for electrical energy ceases.

The lithium metal battery 2 can be charged by applying an external power source to the lithium metal battery to reverse the aforementioned electrochemical reactions that occur during discharge. For example, the external power source can initiate an otherwise non-spontaneous oxidation of intercalated lithium at the positive electrode 40 to produce electrons and lithium ions. The electrons that can flow back toward the negative electrode 20 through the external circuit, and the lithium ions that can be carried through the ionic channels of the MOF electrolyte layer 10 and back toward the negative electrode 20 can reunite at the negative electrode 20 and replenish the negative electrode 20 with inserted lithium for consumption during a subsequent discharge cycle.

The negative electrode 20 can comprise a lithium metal (Li). The positive electrode 30 can comprise a material that can sufficiently undergo lithium insertion and deinsertion. Examples of such materials include $LiCoO_2$ (LCO), LiNiMnCoO$_2$ (NMC), lithium iron phosphate ($LiFePO_4$), lithium iron fluorophosphate ($Li_2FePO_4F$), an over-lithiated layer by layer electrode, spinel lithium manganese oxide ($LiMn_2O_4$), lithium cobalt oxide ($LiCoO_2$), $LiNi_{0.5}Mn_{1.5}O_4$, lithium nickel cobalt aluminum oxide (e.g., $LiNi_{0.8}Co_{0.15}Al_{0.05}O_2$ or NCA), lithium vanadium oxide ($LiV_2O_5$), or $Li_2MSiO_4$ (where M is at least one of Co, Fe, or Mn).

The MOF electrolyte layer 10 can likewise be used in various other batteries such as magnesium metal batteries, sodium metal batteries, or zinc metal batteries. In such batteries, the negative electrodes 20 can include magnesium, sodium, or zinc, respectively, and the positive electrodes 30 for sodium metal batteries can include $NaMnO_2$, $NaFePO_4$, or $Na_3V_2(PO_4)_3$; positive electrodes 30 for magnesium metal batteries can include $TiSe_2$, $MgFePO_4F$, $MgCo_2O_4$, or $V_2O_5$; and positive electrodes 30 for zinc metal batteries can include $\gamma$-$MnO_2$, $ZnMn_2O_4$, or $ZnMnO_2$.

The battery 2 can be a rechargeable (or secondary) battery, where the electrochemical reactions are electrically reversible.

The battery can be used in a variety of applications, for example, in electronic devices, tools, machinery, or vehicles (for example, in electric, hybrid electric vehicles, or plug-in hybrid electric vehicles).

The following examples are provided to illustrate the present disclosure. The examples are merely illustrative and are not intended to limit devices made in accordance with the disclosure to the materials, conditions, or process parameters set forth therein.

EXAMPLES

Examples 1-4: Effect of an MOF Electrolyte Layer in a Lithium Metal Battery

Four lithium metal batteries were prepared as illustrated in FIG. 2 using a lithium metal electrode, a $LiNi_{0.6}Mn_{0.2}Co_{0.2}O_2$ (NMC622) electrode, and a polypropylene separator 30. The electrolyte layer 10 of Example 1 was 1M $LiPF_6$ in EMC/FEC in a MOF/PVDF mixed matrix.

The electrolyte layers 10 of Examples 2-4 were MOF electrolyte layers included an FeMOF, a ZrMOF, and a CuMOF, respectively. The electrolyte layers were first prepared by forming a slurry comprising the MOF and PVDF, the slurry was cast, and the film was dried. The metal salt was then absorbed into the MOF in the presence of ethylmethyl carbonate and fluoroethylene carbonate as the nonaqueous solvents and the substrate was dried at atmospheric conditions to form the MOF electrolyte layers.

Figure 3:
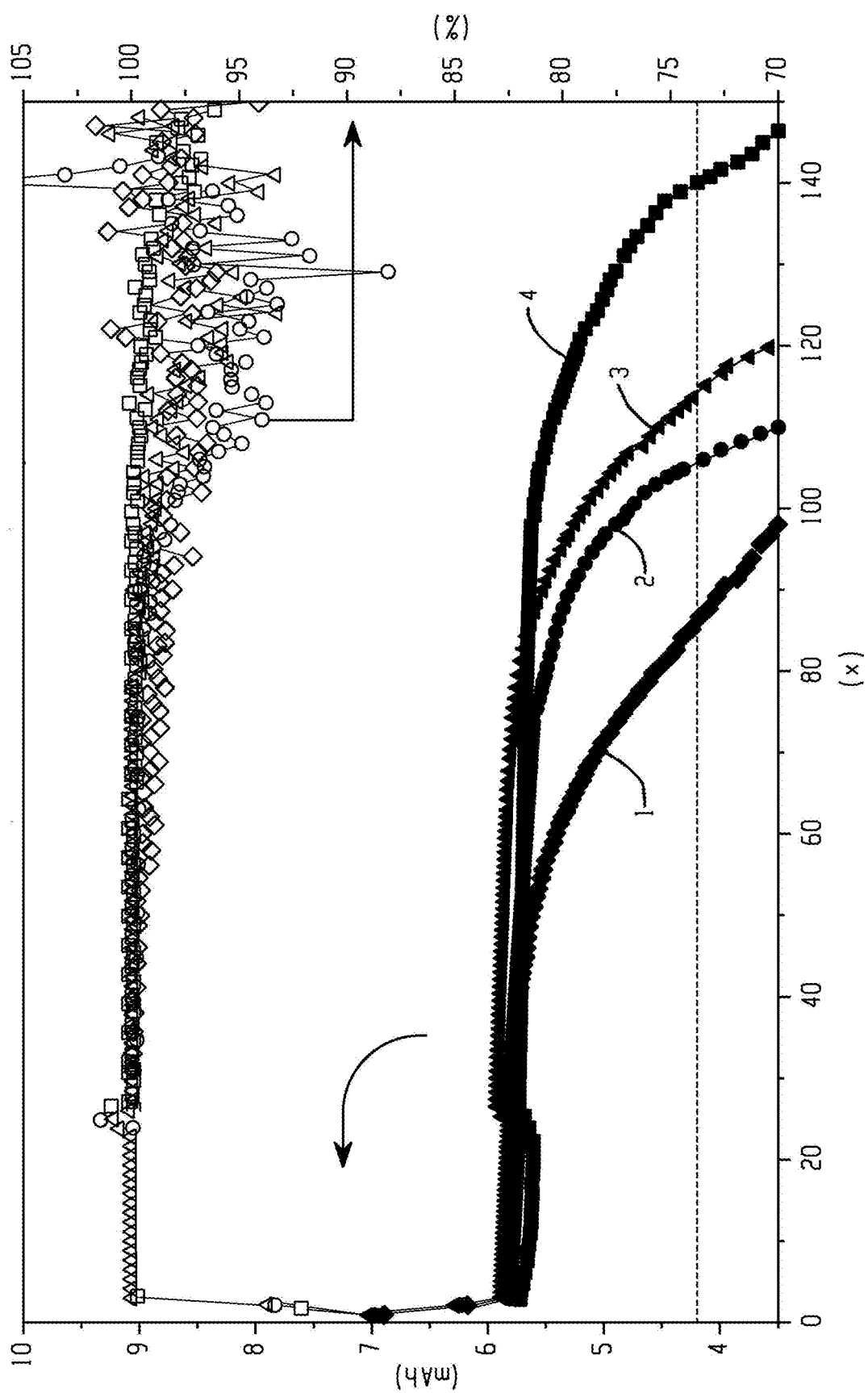
FIG. 3 is a graphical illustration of the cycling results of the examples.

The total cell capacity in milliampere hours (mAh) and the coulombic efficiency in percent (%) were measured with cycle number and the results are shown in FIG. 3, where the horizontal dashed line is the 70% retention goal.

FIG. 3 shows that the total cell capacity (mAh) for all of the lithium metal batteries of Examples 2-4 comprising the MOF electrolyte layer have an increased cell capacity with cycle number (x) as compared to the lithium metal battery of Example 1. FIG. 3 also shows that the coulombic efficiency (%) of all of the lithium metal batteries all have good coulombic efficiencies.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context.

Reference throughout the specification to "a feature", "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

The endpoints of all ranges directed to the same component or property are inclusive of the endpoints, are independently combinable, and include all intermediate points and ranges. For example, a range of "5 to 20 weight percent" is inclusive of the endpoints and all intermediate values of the ranges of such as 10 to 23 weight percent, etc.). The term "at least one of" means that the list is inclusive of each element individually, as well as combinations of two or more elements of the list, and combinations of at least one element of the list with like elements not named. Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. A MOF electrolyte layer, comprising:
 a plurality of metal-organic framework regions, each having a porous structure and comprising a solvated salt absorbed in the porous structure; and
 a polymer comprising at least one of a fluoropolymer, a polyolefin, an acrylate, or polyacrylonitrile, the polymer structured such that each region of the plurality of metal-organic framework regions is separated from each other region by a portion of the polymer and the porous structures are free of the polymer;

wherein the MOF electrolyte layer has at least one of a density of 0.03 g/cm$^3$ to 0.3 g/cm$^3$ or a Brunauer-Emmett-Teller (BET) surface area of 500 to 4,000 m$^2$/g;

wherein each region of the plurality of metal-organic framework regions comprises at least one of an aluminum based MOF, a copper based MOF, an indium based MOF, an iron based MOF, a manganese based MOF, a zirconium based MOF, or a zinc based MOF; and wherein the MOF electrolyte layer comprises 50 to 75 weight percent of the plurality of metal-organic frameworks and 25 to 50 weight percent of the polymer.

2. The MOF electrolyte layer of claim 1, wherein each region of the plurality of metal-organic framework regions has at least one of an average pore size of the MOFs of 1 to 5 nanometers, a pore volume of greater than 0 to 6 cm$^3$/g, or a BET surface area of 2,000 to 4,000 m$^2$/g.

3. The MOF electrolyte layer of claim 1, wherein the solvated salt comprises a lithium salt of at least one of $ClO_4^-$, $BF_4^-$, $PF_6^-$, TFSI$^-$, or FSI$^-$.

4. The MOF electrolyte layer of claim 1, wherein the MOF electrolyte layer has a thickness of 5 to 50 micrometers.

5. A lithium metal battery comprising:
a MOF electrolyte layer comprising a polymer and a plurality of metal-organic framework regions, each region having a porous structure and comprising a solvated salt absorbed in the porous structure, the polymer structured such that each region of the plurality of metal-organic framework regions is separated from each other region by a portion of the polymer and the porous structures are free of the polymer;
a negative electrode located on a first side of the MOF electrolyte layer;
a positive electrode located on a second side of the MOF electrolyte layer opposite the negative electrode, wherein the positive electrode and the negative electrode are connected via a closed external circuit;
a separator layer located in between the positive electrode and the MOF electrolyte layer; and
an outer encapsulation layer that forms an enclosure around the negative electrode, the MOF electrolyte layer, the separator layer, and the positive electrode;
wherein the MOF electrolyte layer has at least one of a density of 0.03 g/cm$^3$ to 0.3 g/cm$^3$ or a Brunauer-Emmett-Teller (BET) surface area of 500 to 4,000 m$^2$/g;
wherein each region of the plurality of metal-organic framework regions comprises at least one of an aluminum based MOF, a copper based MOF, an indium based MOF, an iron based MOF, a manganese based MOF, a zirconium based MOF, or a zinc based MOF;
wherein the polymer comprises at least one of a fluoropolymer, a polyolefin, an acrylate, or polyacrylonitrile; and
wherein the MOF electrolyte layer comprises 50 to 75 weight percent of the plurality of metal-organic frameworks and 25 to 50 weight percent of the polymer.

6. The lithium metal battery of claim 5, wherein the solvated salt comprises a lithium salt of at least one of $ClO_4^-$, $BF_4^-$, $PF_6^-$, TFSI$^-$, or FSI$^-$.

7. The lithium metal battery of claim 5, wherein the negative electrode comprises a lithium metal and the positive electrode comprises at least one of $LiCoO_2$, $LiNiMnCoO_2$, lithium iron phosphate, lithium iron fluorophosphate, an over-lithiated layer by layer electrode, spinel lithium manganese oxide, lithium cobalt oxide, $LiNi_{0.5}Mn_{1.5}O_4$, lithium nickel cobalt aluminum oxide, lithium vanadium oxide, or $Li_2MSiO_4$, wherein M is at least one of Co, Fe, or Mn.

8. A method of making a MOF electrolyte layer, comprising
forming a mixture comprising a plurality of metal-organic framework regions, each having a porous structure and comprising a solvated salt absorbed in the porous structure and a polymer, the polymer comprising at least one of a fluoropolymer, a polyolefin, an acrylate, or polyacrylonitrile, the polymer structured such that each region of the plurality of metal-organic framework regions is separated from each other region by a portion of the polymer and the porous structures are free of the polymer; and
forming the MOF electrolyte layer from the mixture;
wherein the MOF electrolyte layer has at least one of a density of 0.03 q/cm$^3$ to 0.3 g/cm$^3$ or a Brunauer-Emmett-Teller (BET) surface area of 500 to 4,000 m$^2$/g;
wherein each region of the plurality of metal-organic framework regions comprises at least one of an aluminum based MOF, a copper based MOF, an indium based MOF, an iron based MOF, a manganese based MOF, a zirconium based MOF, or a zinc based MOF; and
wherein the MOF electrolyte layer comprises 50 to 75 weight percent of the plurality of metal-organic frameworks and 25 to 50 weight percent of the polymer.

9. The method of claim 8, wherein forming the mixture further comprises providing a slurry solvent and forming the MOF electrolyte layer comprises solution casting and drying.

10. The method of claim 8, wherein forming the mixture comprises mixing at a temperature greater than the glass transition temperature of the polymer and forming the MOF electrolyte layer comprises molding.

11. The method of claim 8, further comprising forming the plurality of metal-organic framework regions by soaking the plurality of metal-organic framework regions in a non-aqueous solvent and a liquid electrolyte comprising the solvated salt for an amount of time sufficient to absorb the solvated salt into the porous structure of the metal-organic framework regions.

12. The method of claim 8, wherein solvated salt comprises a lithium salt of at least one of $ClO_4^-$, $BF_4^-$, $PF_6^-$, TFSI$^-$, or FSI$^-$.

* * * * *